Patented June 25, 1935

2,006,202

UNITED STATES PATENT OFFICE 2,006,202

PROCESS FOR HEAT TRANSMISSION

Hendrik Willem Huyser, Hilversum, Netherlands, assignor to Shell Development Company, San Francisco, Calif., a corporation of Delaware No Drawing. Application March 27, 1933, Serial No. 662,997. In The Netherlands June 22, 1932

9 Claims. (Cl. 252—5)

Various substances have already been proposed as heat-transmitting material. Thus, for instance, it is known to use diphenyl, diphenyl oxide, naphthalene, anthracene, glycerine, lubricating oil fractions, sulphur and the like.

The present invention provides for the utilization of a new class of substances as transmitting material and more particularly is concerned with alkylated cyclic compounds which may be heterocyclic as the pyridine, quinoline, azine, acridine, azole and pyrrol series and the like or which may be carbocyclic as the benzene, naphthalene, anthracene series and the like. These cyclic compounds may be further substituted and, if desired, wholly or partly hydrogenated. They may contain one or more alkyl chains which latter may be linked to the cyclic nucleus by a primary, secondary or tertiary carbon atom. A mixture of two or more of these cyclic compounds may be employed as well as individual species.

Many of these alkylated cyclic compounds are able to resist higher temperatures, without decomposing, than the known heat-transmitting materials. Further, in view of their mostly higher boiling temperatures, they can be used at ordinary or slightly raised pressures, which makes it possible to use considerably simplified apparatus.

Where it is desired to employ a heating fluid for high temperature work such as used for indirect heating, power cycles and the like, and the operating temperature is above that at which the heating agent is fairly stable, it may be desirable to stabilize the agent by incorporating with it a substance capable of overcoming any decomposition tendency, preferably a substance of higher boiling temperature which will by mass action or otherwise restrict or obviate any decomposition reaction.

It is frequently advantageous to use mixtures of alkylated cyclic compounds, as these often have a considerably lower melting temperature than the separate substances. Thus, when mixing two substances which are solid at ordinary temperature, one may obtain a mixture that is liquid at ordinary temperature. Eutectic mixtures are therefore desirable.

The advantages of a high boiling temperature, good heat resistance, and low melting temperature are particularly inherent in alkylated naphthalenes, though other alkylated cyclic (including carbocyclic) compounds also possess the advantages in combined form.

Examples of suitable alkylated cyclic compounds are the following fractions originating from the alkylation of benzene or naphthalene and mainly consisting of:

| | Approximate boiling temperature |
|---|---|
| Tri-isopropyl naphthalene | 300–340° C. |
| Di-secondary butyl naphthalene | 300–330° C. |
| Di-tertiary amyl benzene | 260–280° C. |
| Mono-secondary butyl naphthalene | 280–290° C. |
| Dimethyl ethyl naphthalene | 290–300° C. |

The compounds are of great importance in the heating of organic fluids generally and of particular importance in the heating of mineral oils preparatory to distillation for the production of high grade lubricating oils. It is there especially important to avoid all traces of cracking by local overheating and it is possible to accomplish this by the use of the above compounds. The compounds are equally applicable to the evaporation, as for concentration purposes, of other liquids, such as caustic soda lyes, etc., from which it may be desired to evaporate a liquid, while maintaining the residual portion at a high temperature.

The fact that wholly or partly hydrogenated alkylated cyclic compounds may also be used as heat-transmitting material is illustrated by the following examples:

(a) Of a product consisting mainly of tri-isopropyl naphthalene, the fractions with B. P. 11 mm. 170–175° C., B. P. 1.5 mm. 137–150° C. and B. P. 1.5 mm. 145–165° C. were added together, whereby a liquid was formed having the following constants:

$$d\tfrac{15}{4}=0.9450 \text{ and } n\tfrac{27}{D}=1.5560$$

This mixture was hydrogenated, the constants thereby becoming $$d\tfrac{15}{4}=0.9098 \text{ and } n\tfrac{27}{D}=1.5017.$$

The initial material as well as the hydrogenated product were heated during approximately 45 hours at 320–340° C. in Carius tubes with S. M. steel cuttings. On opening the tubes it appeared that no gas had been formed during the heating. Nor did this appear to have given rise to the formation of higher boiling products, owing to the fact that the initial material, which had assumed a brownish color, could be wholly distilled over in vacuo at its original boiling point, while the hydrogenated product also distilled over entirely, though at a temperature of about 10° lower than the other material (B. P. 1.5 mm. 120–150° C.)

(b) Di-secondary butyl naphthalene, B. P. 9 mm. 170–178° C. was dissolved in about 2–3 times its volume of cyclohexane and subsequently hydrogenated under an initial pressure of 100 atmospheres at 150–180° C. with nickel as catalyst. The product obtained had a boiling point at 8 mm. pressure of 170–185° C., $d20/20=0.9479$ and $$n\frac{20}{D} = 1.5548.$$

The elementary analysis showed 88.5% C. and 10.5% H. Theoretically, for the non-hydrogenated product 90.0% C. and 10% H. The elementary analysis of the tetrahydro derivative should show 88.5% C. and 11.5% H. and of the decahydro derivative 86.4% C. and 13.6% H. Apparently, therefore, approximately a tetrahydro derivative was made.

The product obtained, on being heated for 48 hours in the presence of S. M. steel cuttings at 320–330° C. did not undergo any change.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. In a process for transmitting heat to fluids in indirect contact with heat-transmitting material, the step of employing an open chain alkylated cyclic compound as the heat-transmitting material.

2. In a process for transmitting heat to fluids in indirect contact with heat-transmitting material, the step of employing an open chain alkylated carbocyclic compound as the heat-transmitting material.

3. In a process for transmitting heat to fluids in indirect contact with heat-transmitting material, the step of employing an alkylated naphthalene as the heat-transmitting material.

4. In a process for transmitting heat to fluids in indirect contact with heat-transmitting material, the step of employing a mixture of alkylated cyclic compounds containing an open chain alkylated cyclic compound as the heat-transmitting material.

5. In a process for transmitting heat to fluids in indirect contact with heat-transmitting material, the step of employing an open chain alkylated cyclic compound, the nucleus of which is at least partially hydrogenated above its normal hydrogen content, as the heat-transmitting material.

6. In a process for transmitting heat to fluids in indirect contact with heat transmitting material at highly elevated temperatures, the step of employing an alkylated heterocyclic compound as a heat transmitting material.

7. In a process for transmitting heat to fluids in indirect contact with heat transmitting material at highly elevated temperatures, the step of employing an open chain alkylated member of the benzene series as a heat transmitting material.

8. In a process for transmitting heat to fluids in indirect contact with heat transmitting material at highly elevated temperatures, the step of employing a eutectic mixture of alkylated cyclic compounds as a heat transmitting material.

9. In a process for transmitting heat to fluids in indirect contact with heat transmitting material at highly elevated temperatures, the step of employing alkylated cyclic compounds stabilized with a decomposition compound thereof as a heat transmitting material.

HENDRIK WILLEM HUYSER.